(12) United States Patent
Herman

(10) Patent No.: US 10,547,941 B1
(45) Date of Patent: Jan. 28, 2020

(54) VEHICLE ACOUSTIC TRANSDUCER OPERATION

(71) Applicant: Ford Global Technologies, LLC, Dearborn, MI (US)

(72) Inventor: David Michael Herman, Oak Park, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/248,894

(22) Filed: Jan. 16, 2019

(51) Int. Cl.
*H04R 3/04* (2006.01)
*B60Q 5/00* (2006.01)
*G08B 3/10* (2006.01)
*H04R 1/32* (2006.01)

(52) U.S. Cl.
CPC ............... *H04R 3/04* (2013.01); *B60Q 5/005* (2013.01); *G08B 3/10* (2013.01); *H04R 1/323* (2013.01)

(58) Field of Classification Search
None
See application file for complete search history.

(56) References Cited

U.S. PATENT DOCUMENTS

| | | | |
|---|---|---|---|
| 6,130,859 A * | 10/2000 | Sonnenschein | H04B 13/02 340/850 |
| 6,429,804 B1 | 8/2002 | Kishida et al. | |
| 8,384,584 B2 | 2/2013 | Karr | |
| 9,630,619 B1 | 4/2017 | Kentley et al. | |
| 9,878,664 B2 | 1/2018 | Kentley-Klay et al. | |
| 9,928,734 B2 | 3/2018 | Newman | |
| 9,956,910 B2 | 5/2018 | McNew | |
| 2003/0052795 A1 * | 3/2003 | Schlick | G01S 7/527 340/903 |
| 2015/0264500 A1 * | 9/2015 | Aoyagi | G10K 15/00 381/56 |
| 2016/0229340 A1 * | 8/2016 | Sakakibara | B60Q 5/008 |
| 2018/0154829 A1 | 6/2018 | Kentley-Klay et al. | |

FOREIGN PATENT DOCUMENTS

| | | | |
|---|---|---|---|
| JP | 2011255830 A | * | 12/2011 |
| JP | 2011255830 A | | 12/2011 |
| JP | 2014052883 A | * | 3/2014 |
| WO | 2017048064 A1 | | 3/2017 |

OTHER PUBLICATIONS

"The Doppler Effect for Sound." HyperPhysics, Oct. 4, 2018, hyperphysics.phy-astr.gsu.edu/hbase/Sound/dopp.html. (Year: 2018).*
Machine English translation of JP 2011255830 A (Year: 2011).*
Machine English translation of JP 2014052883 A (Year: 2014).*

(Continued)

*Primary Examiner* — James K Mooney
(74) *Attorney, Agent, or Firm* — Frank A. MacKenzie; Bejin Bieneman PLC

(57) ABSTRACT

A system includes a computer and a memory, the memory storing instructions executable by the computer to identify a target and to adjust a frequency of an acoustic message from a vehicle based on a predicted target trajectory and a predicted vehicle trajectory.

20 Claims, 6 Drawing Sheets

(56) References Cited

OTHER PUBLICATIONS

JasonR—Response to "digital communications—How to estimate and compensate for doppler shift in wireless signals?", Oct. 24, 2011, https://dsp.stackexchange.com/questions/422/how-to-estimate-and-compensate-for-doppler-shift-in-wire . . .
Mengali et al., "Synchronization Techniques for Digital Receivers", Plenum Press, Jan. 1997, https://www.researchgate.net/publication/299846062_Synchronization_Techniques_for_Digital_Receiv . . .
Nyongesa et al., "Doppler Shift Compensation Schemes in VANETs", Mobile Information Systems, vol. 2015, Article ID 438159, http://dx.doi.org/10.1155/2015/438159.
Lian, "Improving Tracking Performance of PLL in High Dynamic Applications", University of Calgary, Nov. 2004, http://www.geomatics.ucalgary.ca/links/GradTheses.html.

\* cited by examiner

VEHICLE ACOUSTIC TRANSDUCER OPERATION

BACKGROUND

Vehicles can emit acoustic messages to the surrounding environment to communicate with targets, e.g., pedestrians, other vehicles, etc. The acoustic messages can include, e.g., sirens, horn sounds, messages, etc. The acoustic messages travel as acoustic waves through air to the targets. These messages may be affected by the relative motion of objects resulting in a Doppler shift.

DETAILED DESCRIPTION

Figure 1:
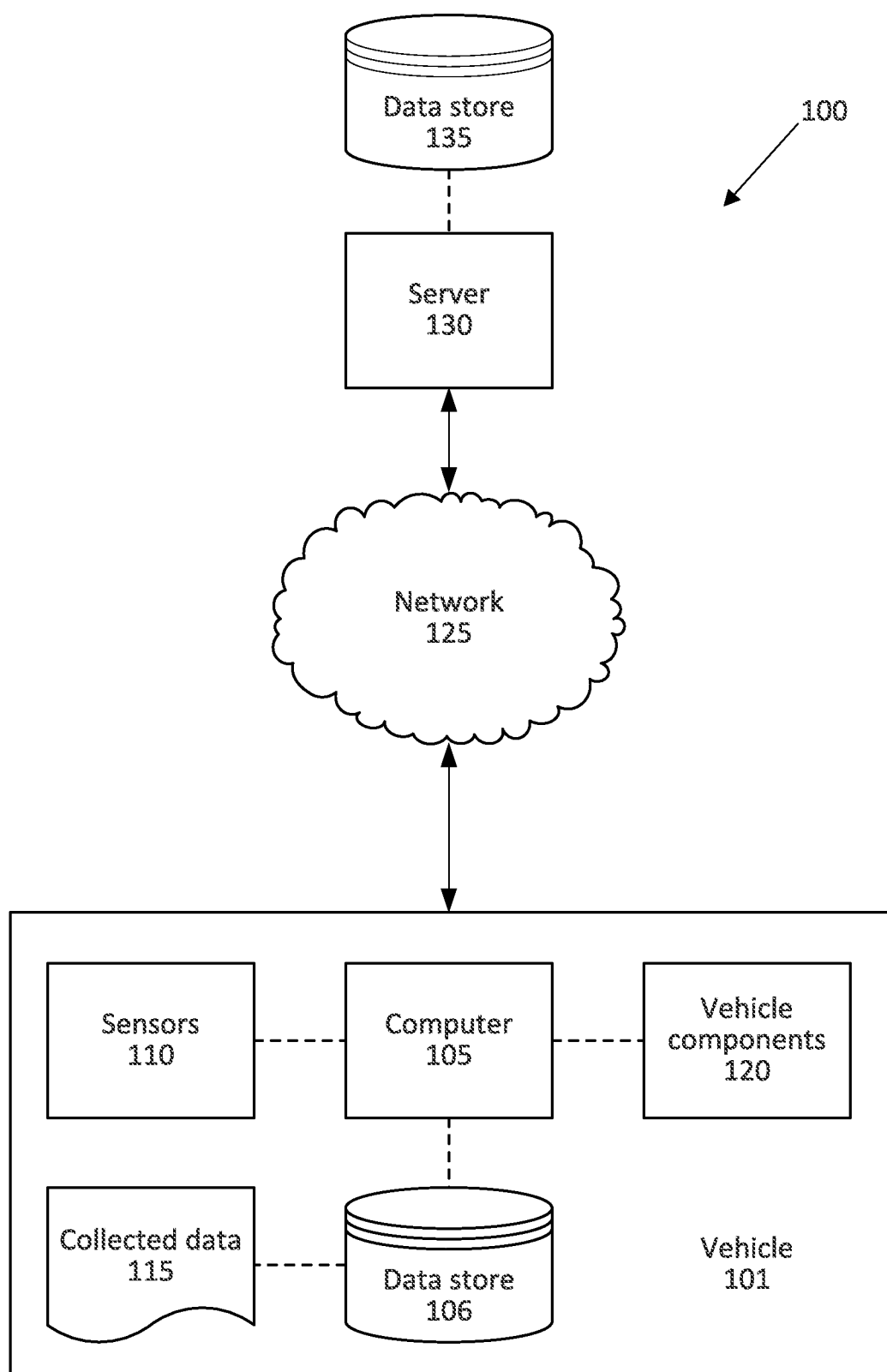
FIG. 1 is a block diagram of an example system for transmitting an acoustic message from a vehicle.

A system includes a computer and a memory, the memory storing instructions executable by the computer to identify a target and adjust a frequency of an acoustic message from a vehicle based on a predicted target trajectory and a predicted vehicle trajectory.

The instructions can further include instructions to identify a frequency shift of the acoustic message based on the predicted target trajectory and the predicted vehicle trajectory.

The instructions can further include instructions to adjust the frequency of the acoustic message to reduce the frequency shift below a shift threshold.

The instructions can further include instructions to identify a type of the target and to predict the target trajectory based on the type of the target.

The instructions can further include instructions to, while emitting the acoustic message, predict a second target trajectory and a second vehicle trajectory and to adjust the frequency of the acoustic message based on the second predicted target trajectory and the second predicted vehicle trajectory.

The instructions can further include instructions to identify a relative velocity between the target and the vehicle and to adjust the frequency of the acoustic message based on the relative velocity.

The instructions can further include instructions to actuate a transducer to steer the acoustic message toward the target.

The instructions can further include instructions to identify a direction vector between the transducer and the target and to rotate the transducer to align with the direction vector.

The instructions can further include instructions to determine a weather datum and to adjust the frequency based on the weather datum.

The weather datum can be at least one of a temperature, a humidity, or an air pressure.

The instructions can further include instructions to determine an ambient speed of sound based on the weather datum.

The instructions can further include instructions to identify a second target and to adjust the frequency of the acoustic message based on the predicted target trajectory and a predicted second target trajectory.

The instructions can further include instructions to adjust an emitted frequency of the acoustic message to generate a predicted perceived frequency received by the target that is within a threshold of a recorded frequency of the acoustic message.

The instructions can further include instructions to identify a change in a target trajectory and to adjust the frequency of the acoustic message based on the change in the target trajectory.

A method includes identifying a target and adjusting a frequency of an acoustic message from a vehicle based on a predicted target trajectory and a predicted vehicle trajectory.

The method can further include identifying a frequency shift of the acoustic message based on the predicted target trajectory and the predicted vehicle trajectory.

The method can further include adjusting the frequency of the acoustic message to reduce the frequency shift below a shift threshold.

The method can further include identifying a type of the target and predicting the target trajectory based on the type of the target.

The method can further include, while emitting the acoustic message, predicting a second target trajectory and a second vehicle trajectory and adjusting the frequency of the acoustic message based on the second predicted target trajectory and the second predicted vehicle trajectory.

The method can further include identifying a relative velocity between the target and the vehicle and adjusting the frequency of the acoustic message based on the relative velocity.

The method can further include actuating a transducer to steer the acoustic message toward the target.

The method can further include identifying a direction vector between the transducer and the target and rotating the transducer to align with the direction vector.

The method can further include determining a weather datum and adjusting the frequency based on the weather datum.

The method can further include determining an ambient speed of sound based on the weather datum.

The method can further include identifying a second target and adjusting the frequency of the acoustic message based on the predicted target trajectory and a predicted second target trajectory.

The method can further include adjusting an emitted frequency of the acoustic message to generate a predicted perceived frequency received by the target that is within a threshold of a recorded frequency of the acoustic message.

The method can further include identifying a change in a target trajectory and adjusting the frequency of the acoustic message based on the change in the target trajectory.

A system includes a transducer, means for identifying a target, and means for adjusting a frequency of an acoustic message emitted from the transducer based on a predicted target trajectory and a predicted vehicle trajectory.

The system can further include means for identifying a frequency shift of the acoustic message based on the predicted target trajectory and the predicted vehicle trajectory.

The system can further include means for steering the transducer to steer the acoustic message toward the target.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can determine to communicate with a target, e.g., a pedestrian, a cyclist, another vehicle, etc. The communication can be an acoustic message emitted from an acoustic transducer. The acoustic message can be, e.g., a verbal message indicating approach of the vehicle, a siren, a horn sound, a salutation, etc. The computer can identify the target and a corresponding message to send to the target. For example, the computer can select a message based on, e.g., a predicted trajectory of the target approaching the vehicle. In another example, the computer can identify another vehicle with vehicle-to-vehicle communication and select a message based on the communication. Adjusting an emitted frequency of the acoustic message can account for a frequency shift of the acoustic message caused by relative movement of the target and the vehicle, allowing the target to receive the acoustic message at a substantially consistent frequency, i.e., a frequency that does not vary substantially over a time of reception and the original recorded message in the absence of relative motion. By predicting trajectories of the target and the vehicle, the computer can adjust the emitted frequency to minimize the change in the perceived frequency caused by the frequency shift observed by the receiver. This will result in a minimized frequency shift in the intended message at the receiver. The computer can further predict an ambient speed of sound, which can affect the frequency shift. As a relative velocity between the vehicle and the target changes, the computer can adjust the emitted frequency of the acoustic message to compensate for the frequency shifts caused by the changes in the relative velocity. The computer can actuate movement of a transducer relative to the vehicle and toward the target to direct the acoustic message to the target. Thus, the target receives the acoustic message at a substantially consistent frequency as the vehicle passes the target and emits the acoustic message.

FIG. 1 illustrates an example system 100 for generating and transmitting an acoustic message from a vehicle 101. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, time of flight cameras, LIDAR, and/or ultrasonic transducers. Other types of sensors may include pressure sensors, temperature sensors, and the like, to determine the properties of the environment around the vehicle which can affect the propagation of sound waves in the environment.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote computers such as the server 130, via the network 125, a server 130 possibly including or being coupled to a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services. In the case of vehicles or other targets equipped with V2X communication it is expected that those targets could at substantially consistent intervals, e.g., 10 times per second, provide their current location, orientation, and velocity. This information may then be used to augment the vehicle's determination of those values based on sensor 110 data 115.

Figure 2:
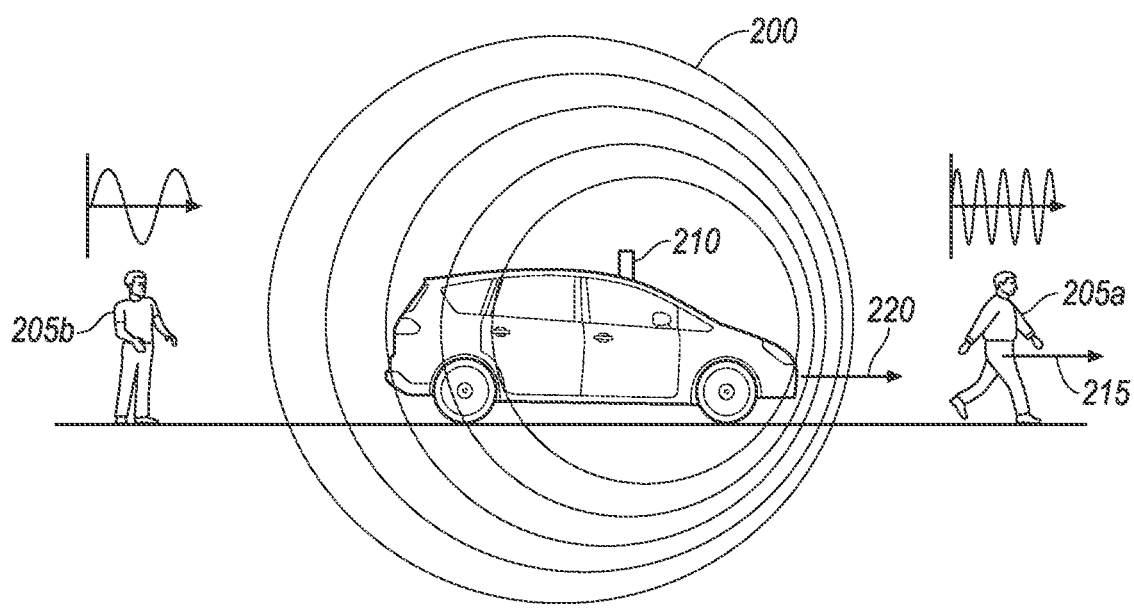
FIG. 2 is a view of an example vehicle transmitting an example acoustic message.

FIG. 2 illustrates an example vehicle 101 transmitting an acoustic message 200 to a target 205. As used herein, an "acoustic message" is a sound or series of sounds encoding or otherwise providing information for a target 205, e.g., a verbal message, a siren, a horn sound, etc. For example, the acoustic message 200 can be a warning to a target 205 indicating the presence of the vehicle 101 approaching the target 205. FIG. 2 shows two targets 205a, 205b. The target 205 can be, e.g., a pedestrian, a cyclist, a pedestrian on a scooter, a pedestrian on a unicycle, etc.

The computer 105 can actuate a transducer 210 to transmit the acoustic message 200. The transducer 210 can be mounted to or at an outer portion of the vehicle 101 to emit the acoustic message 200 out from the vehicle 101, e.g., a vehicle 101 roof, a vehicle 101 front hood, etc. The transducer 210 emits acoustic waves (i.e., sound waves) at specified frequencies to transmit the acoustic message 200. The transducer 210 can be a speaker including a diaphragm and a coil. When electricity flows through the coil at specific frequencies, the coil vibrates the diaphragm at those specific frequencies, generating acoustic waves that are emitted from the diaphragm. The acoustic waves thus result in a sound emitted from the transducer 210. The computer 105 can supply electricity at the specific frequencies to the coil to generate a specific sound from the diaphragm, i.e., the acoustic message 200. The computer 105 can supply the electricity at predetermined frequencies stored in the data store 106 corresponding to a specific acoustic message 200, e.g., according to a recording of the acoustic message 200 stored in the data store 106, according to a list of specific frequencies and times at which to supply electricity to the transducer 210, etc.

Figure 3:
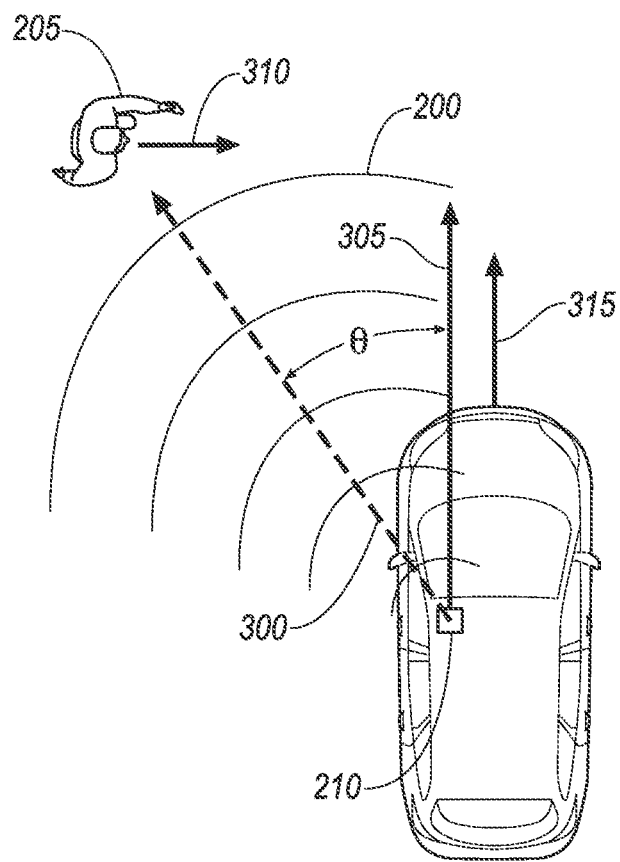
FIG. 3 is a plan view of the example vehicle transmitting the example acoustic message to an example target.
Figure 4:
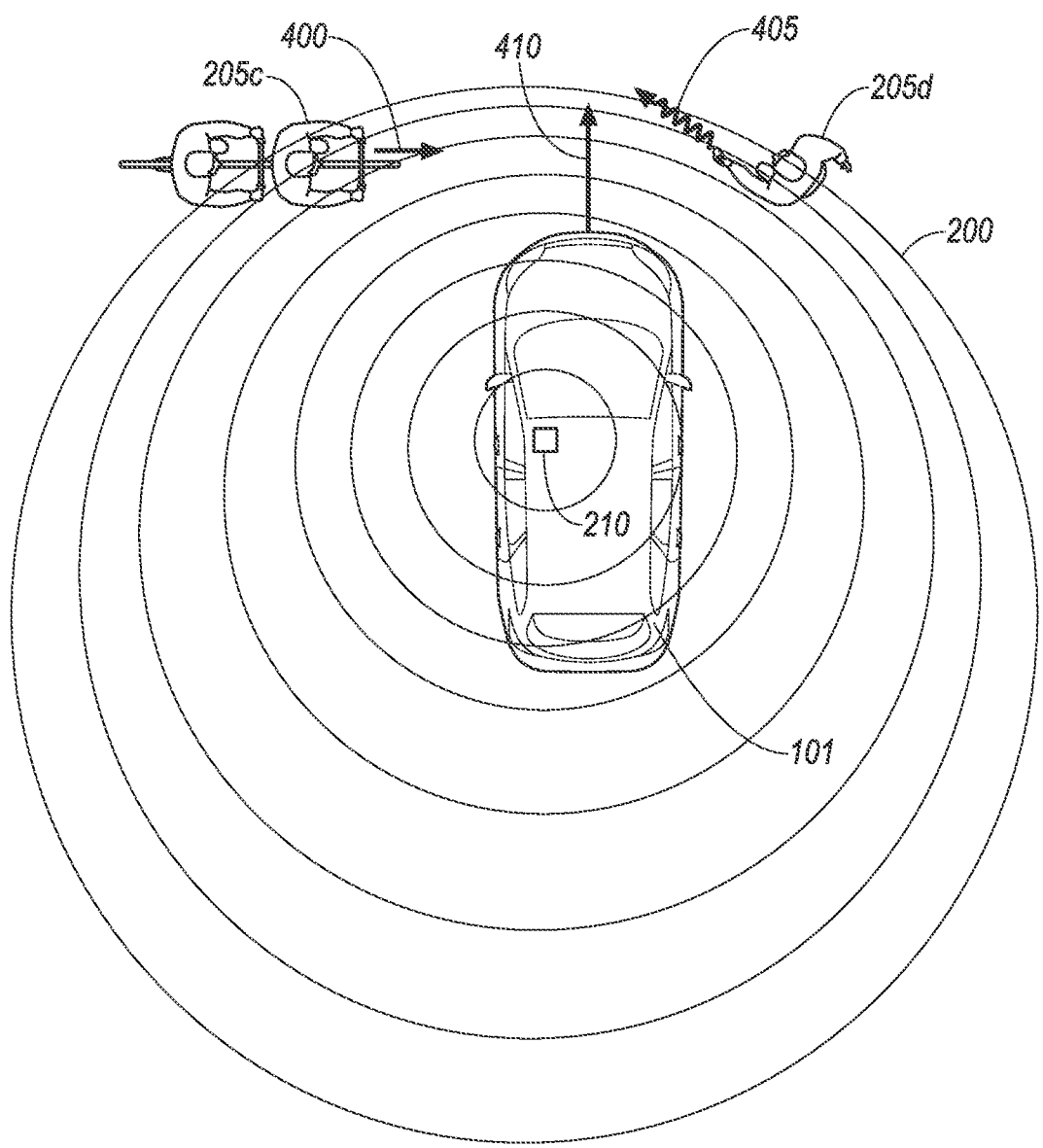
FIG. 4 is a plan view of the example vehicle transmitting the example acoustic message to a plurality of example targets.

The transducer 210 can be movable to direct the acoustic message 200 toward the target 205, as shown in FIG. 3. For example, the transducer 210 can be attached to a post rotatable about a vertical axis, and the computer 105 can actuate a motor (not shown) to rotate the post to move the diaphragm of the transducer 210 to direct the acoustic message 200 toward the target 205 (i.e., along a straight line between the transducer 210 and the target 205) as the vehicle 101 approaches the target 205. Alternatively, the transducer 210 can emit the acoustic message 200 in all directions, as shown in FIG. 4. In another example, acoustic beam forming may be utilized in which an acoustic beam steering array generates a beam of steered acoustic energy into the environment directed towards the target 205 of the message 200.

When the vehicle 101 and/or the target 205 moves relative to one another, the acoustic message 200 can undergo a frequency shift, i.e., a Doppler shift. For example, in FIG. 2, the target 205a can have a target trajectory 215, the vehicle 101 can have a vehicle trajectory 220, and the target 205b can be stationary. The differences in the trajectories 215, 220 and/or a stationary target 205 can result in the frequency shift. The transducer 210 emits the acoustic message 200 at a specified frequency. As the transducer 210 transmits the acoustic message 200, each successive wave of the acoustic message 200 is closer to the previous wave of the acoustic message 200 in the direction of travel of the vehicle 101 and farther from the previous wave of the acoustic message away from the direction of travel of the vehicle 101. Thus, the target 205a, in front of the vehicle 101, hears the acoustic message 200 at a higher frequency than the frequency emitted from the transducer 210, and the target 205b, behind the vehicle 101, hears the acoustic message 200 at a lower frequency than the frequency emitted from the transducer 210. The frequency of the acoustic message 200 heard by the target 205a, 205b is the "perceived frequency" f, measured in Hertz (Hz), and can be determined as follows:

$$f(t) = \left(\frac{c}{c + V_{rel}}\right) f_0(t) \qquad (1)$$

where t is time measured in seconds, c is the speed of sound through the ambient environment measured in meters per second, $V_{rel}$ is a relative velocity between the vehicle 101 and the target 205 measured in meters per second, and $f_0$ is the emitted frequency (measured in Hz) of the acoustic message 200 from the transducer 210. The time t indicates that the perceived frequency f(t) and the emitted frequency $f_0$(t) can be functions of time. Thus, the perceived frequency f can be determined based on a current speed of sound c of the ambient air. As discussed below, the speed of sound c can change based on, e.g., air temperature, air pressure, air humidity, etc., and thus the perceived frequency f can accordingly change.

FIG. 3 illustrates the computer 105 actuating the transducer 210 to direct the acoustic message 200 toward a target 205. As used herein, to "direct" the acoustic message 200 is to move the transducer 210 so that a flight path of the acoustic message 200 is toward the target 205. As used herein, a "flight path" is a path along which the acoustic message 200 travels. That is, the computer 105 can rotate the transducer 210 toward the target 205 (i.e., along a straight line between the transducer 210 and the target 205), and the transducer 210 can steer the flight path of the acoustic message 200 toward of the target 205. The computer 105 can identify a direction vector 300 (i.e., a line starting at the transducer 210 and ending at the target 205 in a two-dimensional vehicle coordinate system) and can rotate the transducer 210 to a specified angle θ defined between the direction vector 300 and a forward direction 305 of the transducer 210 to align the flight path of the acoustic message 200 with the direction vector 300.

The computer 105 can identify the target 205. The computer 105 can actuate one or more sensors 110 to collect data 115 about the target 205. The computer 105 can predict a target trajectory 310 based on the data 115 of the target 205. As used herein, a "trajectory" is set of data including a speed, position, and direction of travel for each of one or more times, and a "predicted trajectory" is a prediction of the speed and path (i.e., the position along the direction of travel) of an object, e.g., the vehicle 101, the target 205, etc., over each of one or more times. The target trajectory 310 indicates the path and speed the computer 105 predicts the target 205 will follow. The trajectory 310 of the target 205 can be based on a type of target 205, e.g., a pedestrian, a cyclist, etc. As used herein, a "type" of target 205 is a classification of the target 205 based on a characteristic and/or a component that affect the speed and position of the target 205. For example, the type "cyclist" indicates that the target 205 includes a human-powered cycle, e.g., a unicycle, a bicycle, a tricycle, a quadricycle, etc. In another example, the type "pedestrian" indicates that the target 205 has no additional component to move, i.e., the target 205 walks and/or runs. The computer 105 can identify the type of the target 205 based on data 115 collected by the sensors 110. In addition, the computer 105 can, based on data 115 from one or more sensors 110, determine a distance between the vehicle 101 and the target 205 and the target type, e.g. a person in another vehicle, a person on a skateboard, etc., and can adjust a magnitude of the emitted sound wave of the acoustic message 200 to achieve a desired message magnitude intensity at the target 205.

Upon identifying the type of the target 205, the computer 105 can predict the target trajectory 310 based on the type of the target 205. For example, if the type of the target 205 is "pedestrian," the computer 105 can predict the trajectory 310 of the target 205 based on values for pedestrian speed, e.g., 5-10 kilometers per hour (kph), determined by empirical testing of pedestrian movement and stored in the data store 106 and/or the server 130. In another example, if the type of the target is "cyclist," the computer 105 can predict the trajectory of the target 205 based on values for cyclist speed, e.g., 15-25 kph, determined by empirical testing of cyclist movement and stored in the data store 106 and/or the server 130. Alternatively, the computer 105 may utilize a trained neural network based on data 115 from one or more sensors 110, e.g. images, depth maps, point clouds, and prior determined data 115, e.g. HD-maps, to determine a position, orientation, and/or trajectory of the target 205 into the future. The computer 105 can incorporate motion and path planning of the vehicle 101 into the calculation. The computer 105 can store values for each of a plurality of types of targets 205 and can predict the target trajectory 310 based on the specific type of target 205 to determine a more precise adjustment to the frequency of the acoustic message 200.

The computer 105 can predict a vehicle trajectory 315 of the vehicle 101. The predicted vehicle trajectory 315 indicates the path and speed that the computer 105 predicts the vehicle 101 will follow. The computer 105 can collect data 115 about the vehicle 101 with one or more sensors 110, including data 115 about a vehicle 101 speed, direction of travel, turn rate, etc. The computer 105 can also account for a propagation time of a sound wave relative to predicted future vehicle and target relative trajectories when adjusting the acoustic message 200. The computer 105 can predict the vehicle trajectory 315 based on the collected data 115. Based on the predicted target trajectory 310 and the predicted vehicle trajectory 315, the computer 105 can adjust the frequency of the acoustic message 200. That is, the computer 105 can receive specific frequencies at which to actuate the transducer 210 from the data store 106 and can as is conventionally known cause a supply electricity to the transducer 210 at frequencies adjusted from the specific frequencies from the data store 106, e.g., frequencies adjusted higher or frequencies adjusted lower than those stored in the data store 106. Thus, the computer 105 can actuate the transducer 210 to emit the acoustic message 200 at frequencies adjusted according to the predicted target trajectory 310 and the predicted vehicle trajectory 315.

The computer 105 can identify the relative velocity magnitude $V_{rel}$ between the target 205 and the vehicle 101 (i.e., a radial velocity) based on the predicted trajectories 310, 315. As used herein, the "relative velocity" is the relative speed between the target 205 and the vehicle 101. The computer 105 can determine the relative velocity $V_{rel}$ based data 115 from the sensors 110 indicating the respective velocities of the vehicle 101 and the target 200. As described above, the relative velocity $V_{rel}$ can cause a frequency shift of the acoustic message 200 as the waves of the acoustic message 200 compress or expand while travelling from the transducer 210. The computer 105 can adjust the frequency of the acoustic message 200 based on the relative velocity $V_{rel}$ to minimize the frequency shift.

The computer 105 can identify the frequency shift (i.e., a Doppler shift) of the acoustic message 200 based on the predicted target trajectory 310 and the predicted vehicle trajectory 315. As described above, the computer 105 can determine the relative velocity $V_{rel}$ between the vehicle 101 and the target 205, and thus the computer 105 can determine the perceived frequency f. The computer 105 can determine the frequency shift as the difference between the perceived frequency f and the emitted frequency $f_0$.

The computer 105 can adjust the emitted frequency $f_0$ of the acoustic message 200 based on the predicted target trajectory 310 and the predicted vehicle trajectory 315. As described above, the computer 105 can identify the frequency shift between the emitted frequency $f_0$ of the acoustic message 200 emitted from the transducer 210 and the perceived frequency f of the acoustic message perceived by the target 205. The computer 105 can adjust the emitted frequency $f_0$ of the acoustic message 200 to reduce the frequency shift below a shift threshold. The shift threshold can be determined based on, e.g., empirical testing of frequency changes perceptible by targets 205.

The computer 105 can determine an intended frequency $\bar{f}$ at which the target 205 should perceive the acoustic message. The intended frequency $\bar{f}$ can be, e.g., the frequency at which the acoustic message was initially recorded, a predetermined frequency selected based on empirical acoustic testing of users, etc. The computer 105 can determine a frequency adjustment $\Delta f$ to the emitted frequency $f_0$ such that the target 205 perceives the acoustic message 200 at the intended frequency $\bar{f}$ within the shift threshold:

$$\bar{f} = \left(\frac{c}{c+V_{rel}}\right)(f_0 + \Delta f) \Rightarrow \Delta f = \left(\frac{c+V_{rel}}{c}\right)\bar{f} - f_0 \qquad (2)$$

Upon determining the frequency adjustment $\Delta f$, the computer 105 can adjust the emitted frequency $f_0$ of the acoustic message 200 by the frequency adjustment $\Delta f$. The computer 105 can actuate the transducer 210 to adjust the frequency of the acoustic message 200 to supply electricity to the transducer 210 to vibrate the diaphragm at the shifted frequency $f_0 + \Delta f$ such that the target 205 receives the acoustic message 200 at substantially the intended frequency $\bar{f}$.

The computer 105 can determine the frequency adjustment $\Delta f$ with a phase-locked loop. As used herein, a "phase-locked loop" is a control algorithm that acquires and tracks phase and frequency offsets of a signal. The phase-locked loop includes a phase-frequency detector, a loop filter, and a voltage-controlled oscillator. The phase-frequency detector detects a phase difference and a frequency difference between an input signal and an output signal. The loop filter can be, e.g., a band-pass filter to reduce noise from the input signal. The voltage-controlled oscillator adjusts a voltage of the filtered input signal to reduce a frequency difference between the input signal and the output signal, i.e., to "lock" the frequency. Alternatively or additionally, the computer 105 can apply a feedforward algorithm to estimate frequency and/or phase offsets, e.g., estimating phase offsets of input and output signals to predict the frequency adjustment $\Delta f$. Yet further alternatively or additionally, the computer 105 can apply frequency-modulated waveforms and/or differentially encoded phase modulation to account for frequency shifts that are small relative to a frequency range of the acoustic message 200. Yet further alternatively or additionally, the computer 105 can apply the phase-locked loop to determine the frequency adjustment $\Delta f$ for a plurality of targets 205, as described below, which may have different respective perceived frequencies f. The computer 105 can determine, e.g., an average frequency adjustment $\Delta f$ with the phase-locked loop such that the targets 205 perceive a substantially consistent frequency of the acoustic message.

The computer 105 can, upon determining the perceived frequency f, apply the phase-locked loop to the acoustic message 200 to determine the frequency adjustment $\Delta f$. The computer 105 can apply the phase-locked loop to adjust the emitted frequency $f_0$ such that the perceived frequency f is within the shift threshold of the intended frequency $\bar{f}$. That is, the computer 105 can determine the frequency adjustment $\Delta f$ with the phase-locked loop using the perceived frequency f as the input signal and the intended frequency $\bar{f}$ as the output signal, from which the phase-locked loop can determine the frequency difference to lock the frequency at the intended frequency $\bar{f}$, i.e., the frequency adjustment $\Delta f$.

While emitting the acoustic message 200, the current trajectory of the target 205 and/or the current trajectory of the vehicle 101 can change, e.g., the target 205 may slow down, the vehicle 101 may shift roadway lanes, etc. The changes to the target trajectory and/or the vehicle trajectory can generate a new frequency shift to the acoustic message 200. The computer 105 can identify the changes in the target trajectory and/or the vehicle trajectory and adjust the frequency of the acoustic message 200 based on the changes. The computer 105 can predict a second target trajectory 310 and a second vehicle trajectory 315 while emitting the acoustic message 200. Based on the second predicted target trajectory 310 and the second predicted vehicle trajectory 315, the computer 105 can determine a second frequency adjustment $\Delta f$ and adjust the remainder of the acoustic message 200 based on the second frequency adjustment $\Delta f$. Thus, the computer 105 can repeatedly adjust the acoustic message 200 based on the changing predicted trajectories 310, 315 such that the target 205 receives substantially the intended frequency $\bar{f}$ for the entire acoustic message 200.

FIG. 4 illustrates an example vehicle 101 transmitting an acoustic message 200 to a plurality of targets 205. The computer 105 can identify a plurality of targets 205 and determine to transmit an acoustic message 200 to the targets 205. The example of FIG. 4 shows two targets, a first target 205c and a second target 205d, and the computer 105 can identify a different number of targets 205, e.g., three, four, etc.

The computer 105 can predict a first target trajectory 400 for the first target 205c and a second target trajectory 405 for the second target 205d. Because the targets 205c, 205d each move along their respective trajectories 400, 405, the targets 205c, 205d can each perceive the acoustic message 200 with a different frequency shift. For example, the first target 205c can be a cyclist who may be moving at about 20 kph, and the second target 205d can be a pedestrian moving at 5 kph. The different speeds at which the target 205c, 205d move can affect the perceived frequency of the acoustic message 200. Alternatively, the target 205 can change a velocity direction, resulting in a change to the relative velocity $V_{rel}$ that can result in a different frequency shift. For example, the predicted trajectory 405 of the target 205c can change as a result of a turn from a current trajectory, e.g., from a sidewalk into a crosswalk.

To minimize the frequency shifts, the computer 105 can, based on the predicted first target trajectory 400 and the predicted second target trajectory 405, determine a frequency adjustment $\Delta f$ and adjust the frequency of the acoustic message 200. The frequency adjustment $\Delta f$ can be based on, e.g., an average relative velocity $V_{rel}$ based on respective relative velocities between the vehicle 101 and each of the targets 205c, 205d. Thus, the computer 105 transmit the acoustic message 200 adjusted by the frequency adjustment $\Delta f$ to minimize the frequency shifts from the different trajectories 400, 405 of the targets 205c, 205d.

Figure 5:
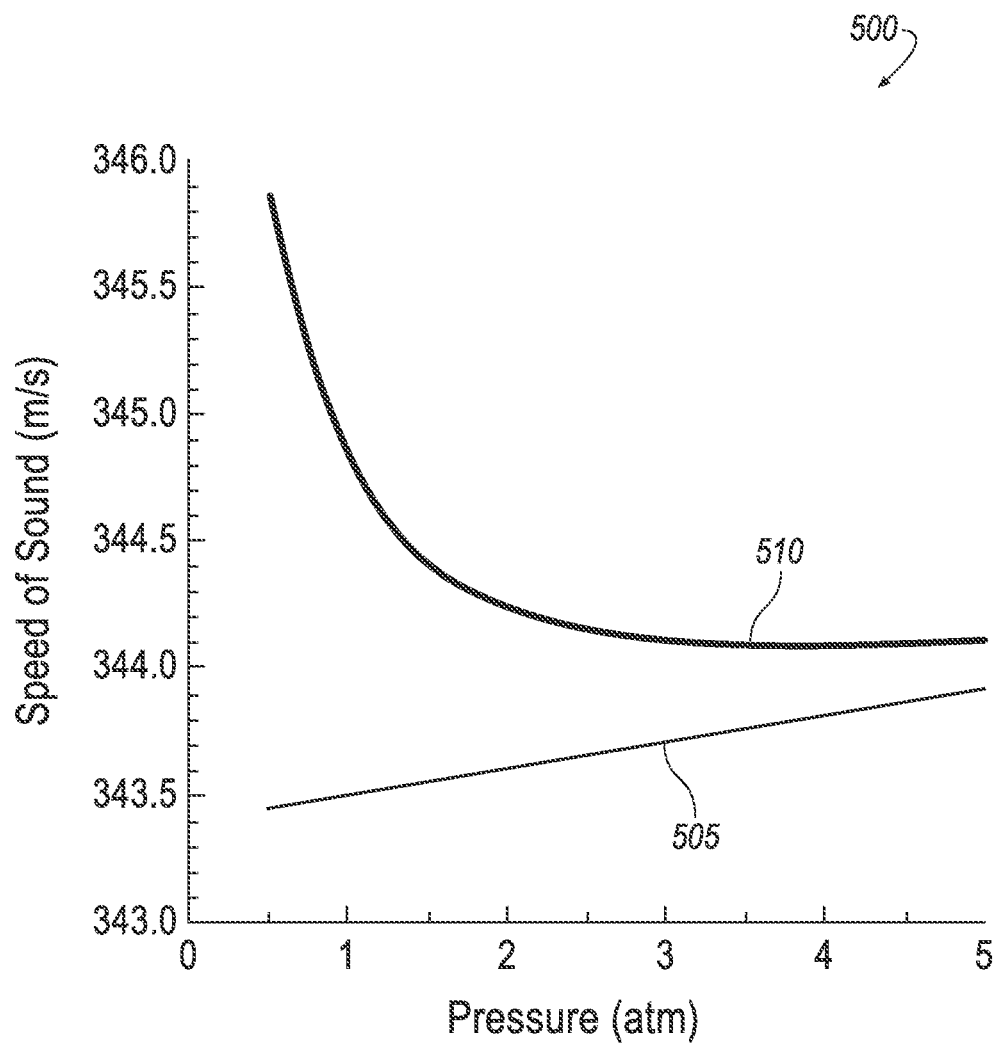
FIG. 5 is a diagram a speed of sound in air based on ambient air pressure and humidity.
Figure 6:
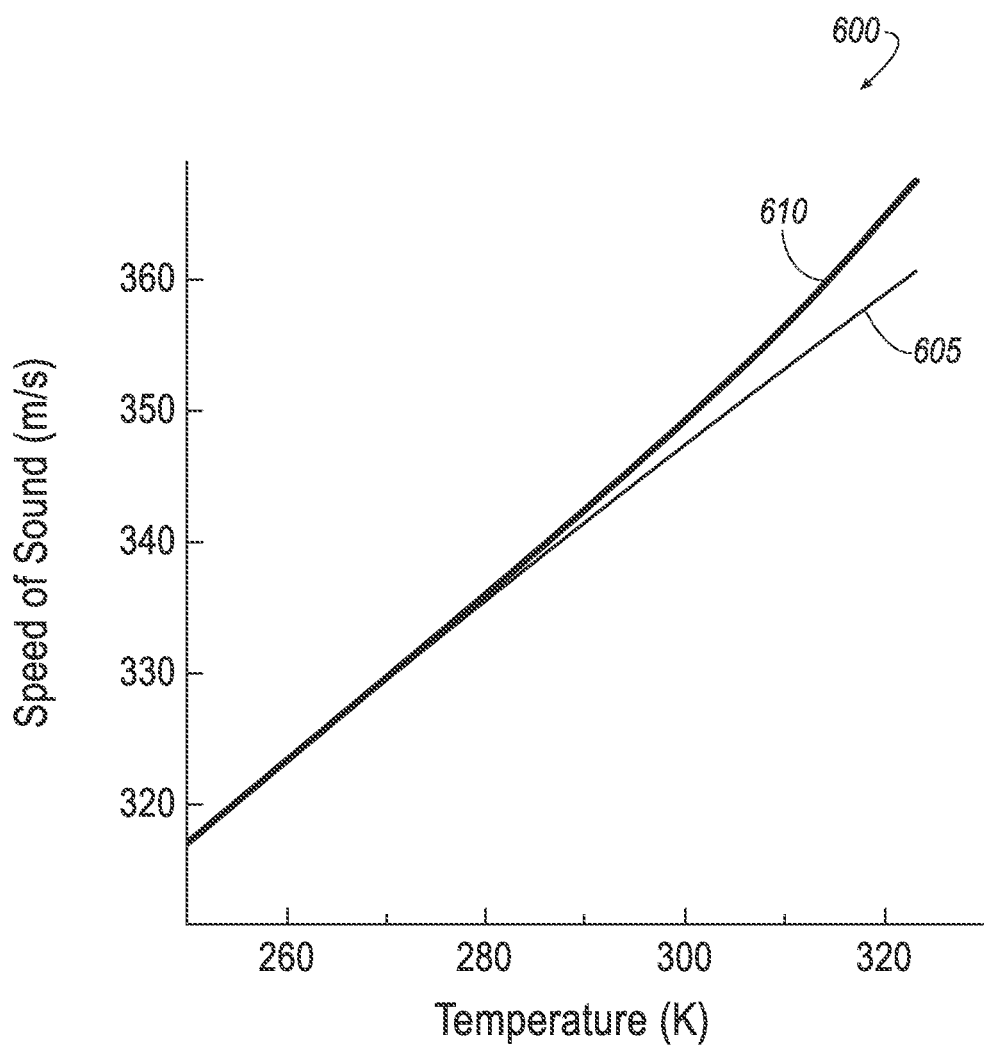
FIG. 6 is a diagram a speed of sound in air based on ambient air temperature and humidity.

FIGS. 5-6 are diagrams of changes to a speed of sound c in air based on changes in air pressure, temperature, and humidity. In addition to the relative velocity $V_{rel}$ between the vehicle 101 and the target 205, the frequency of the acoustic message 200 can be affected by the speed of sound c in the surrounding environment, e.g., the surrounding air. As described below, the computer 105 can adjust the acoustic message 200 based on the specific speed of sound c for the ambient air surrounding the vehicle 101.

FIG. 5 is a diagram 500 illustrating changes to the speed of sound c for an example 1000 Hz acoustic wave in air at 20° C. based on changes to air pressure and humidity. The vertical axis represents the speed of sound c in meters per second (m/s). The horizontal axis represents air pressure in atmospheres.

A first curve 505 shows the change in the speed of sound c for different air pressures at 0% humidity. As the air pressure increases from 1 atmosphere to 5 atmospheres, the speed of sound c increases linearly from about 343.5 m/s to about 344.0 m/s. A second curve 510 shows the change in the speed of sound c for different air pressures at 100% humidity. As the air pressure increases from 1 atmosphere to 5 atmospheres, the speed of sound c decreases from about 344.5 m/s to about 344.0 m/s. Based on the elevation of the surrounding area, the ambient air pressure may typically be about 0.8-1.1 atmospheres.

FIG. 6 is a diagram 600 illustrating the changes to the speed of sound c for an example 1000 Hz acoustic wave at 1 atmosphere based on changes to ambient temperature and humidity. The vertical axis represents the speed of sound c in meters per second (m/s). The horizontal axis represents temperature in Kelvin (K).

A first curve 605 shows the change in the speed of sound c for different temperatures at 0% humidity. As the temperature increases from 280 K (7° C.) to 320 K (47° C.), the speed of sound c increases from about 330 m/s to about 350 m/s. A second curve 610 shows the change in the speed of sound c for different temperatures at 100% humidity. As the temperature increases from 280 K (about 7° C.) to 320 K (about 47° C.), the speed of sound c increases from about 330 m/s to about 355 m/s.

The computer 105 can determine at least one weather datum and adjust the frequency of the acoustic message 200 based on the speed of sound c defined by the datum. The weather datum can be at least one of an ambient air temperature, an ambient air humidity, and/or an ambient air pressure. The computer 105 can determine the weather datum based on, e.g., data 115 from the sensors 110 and/or the server 130. The computer 105 can determine an ambient speed of sound c based on the weather datum. For example, the computer 105 can include a look-up table or the like, e.g., based on graphs like those shown in FIGS. 5-6, stored in the data store 106 and/or the server 130. Based on the specific weather datum, the computer 105 can determine the ambient speed of sound c and can determine the frequency adjustment $\Delta f$ based on the ambient speed of sound c. Thus, the computer 105 can determine a more precise frequency adjustment $\Delta f$ to account for changes in the speed of sound c.

Figure 7:
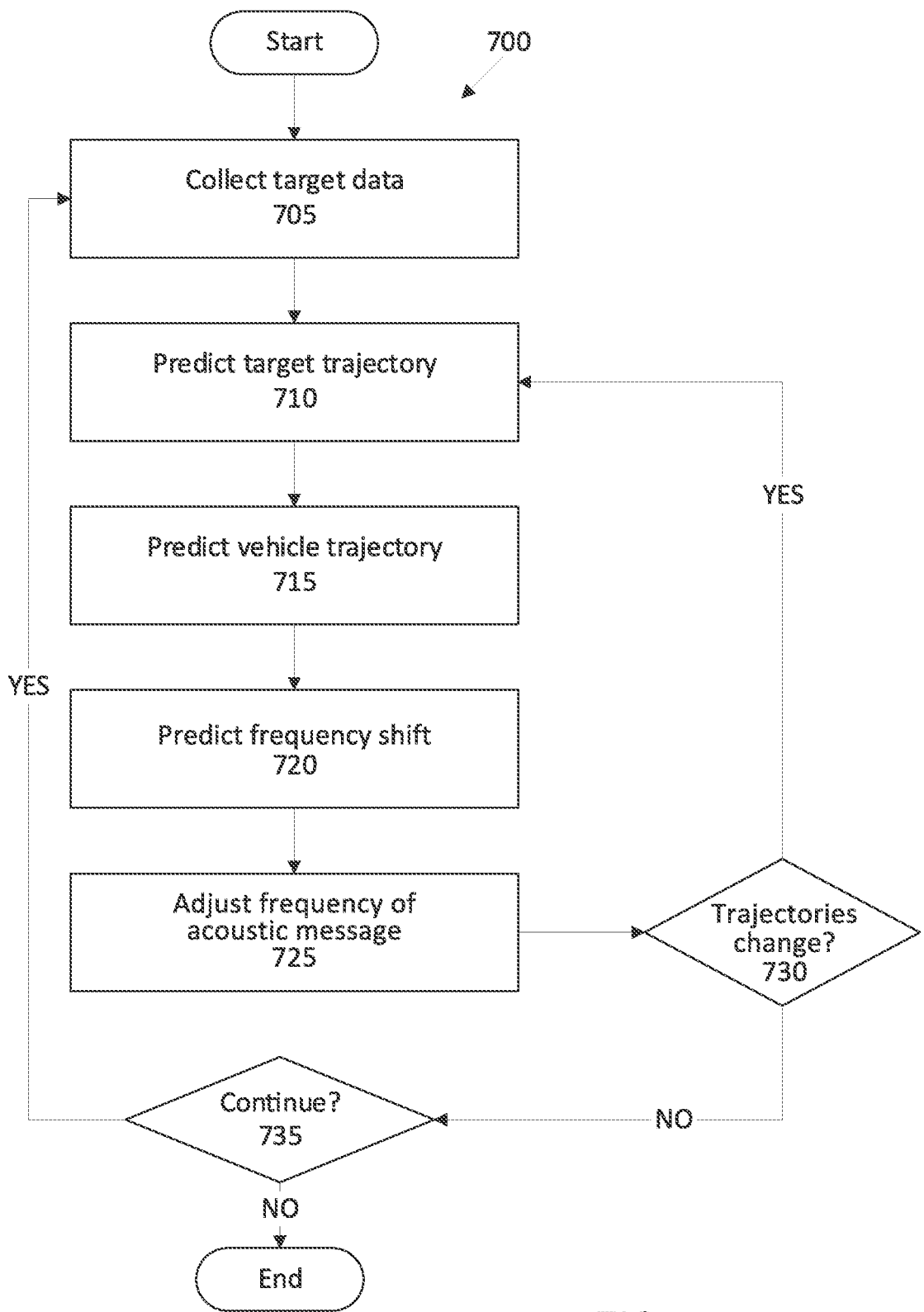
FIG. 7 is a block diagram of an example process for transmitting the acoustic message from the vehicle.

FIG. 7 is a block diagram of an example process 700 for emitting an acoustic message 200 from a vehicle 101. The process 700 begins in a block 705, in which the computer 105 actuates one or more sensors 110 to collect data 115 from an environment surrounding the vehicle 101. The computer 105 can collect data about one or more targets 205, including a target 205 speed, position, acceleration, etc.

Next, in a block 710, the computer 105 predicts a target trajectory 310. As described above, the predicted target trajectory 310 indicates the path and speed the computer 105 predicts the target 205 will follow. Based on the data 115, the computer 105 can predict a direction of travel and speed of the target 205 to determine the target trajectory 310. As described above, the computer 105 can predict the target trajectory 310 based on a type of the target 205, e.g., a pedestrian, a cyclist, etc.

Next, in a block 715, the computer 105 predicts a vehicle trajectory 315. As described above, the predicted vehicle trajectory 315 indicates the path and speed the computer 105 predicts the vehicle 101 will follow. Based on data 115 of the current vehicle 101 speed and direction of travel, the computer 105 can predict the vehicle trajectory 315 as the vehicle 101 approaches the target 205.

Next, in a block 720, the computer 105 predicts a frequency shift (i.e., a Doppler shift) of an acoustic message 200 emitted from the vehicle 101. As described above, the computer 105 can determine a relative velocity $V_{rel}$ between the target 205 and the vehicle 101 based on the predicted target trajectory 310 and the predicted vehicle trajectory 315. The computer 105 can determine an ambient speed of sound c based on ambient weather data 115, e.g., an ambient air pressure, an ambient air temperature, an ambient humidity, etc. Based on the relative velocity $V_{rel}$, the emitted frequency $f_0$ of the acoustic message, and the ambient speed of sound c, the computer 105 can determine the perceived frequency f that the target 205 will perceive the acoustic message 200. The difference in the perceived frequency f and the emitted frequency $f_0$ is the frequency shift.

Next, in a block 725, the computer 105 determines an adjustment for the frequency of the acoustic message 200. As described above, the computer 105 can determine a frequency adjustment $\Delta f$ such that the target 205 will perceive the acoustic message 200 at an intended frequency $\tilde{f}$. For example, the computer 105 can apply a phase-locked loop to determine the frequency adjustment $\Delta f$, as described above. The computer 105 can actuate the transducer 210 to emit the acoustic message 200 adjusted by the frequency adjustment $\Delta f$. That is, the computer 105 can supply electricity to vibrate the diaphragm of the transducer 210 at the adjusted frequency $f_0 + \Delta f$ to emit the acoustic message 200 to account for the frequency shift.

Next, in a block 730, the computer 105 determines a current trajectory of the target 205 and a current trajectory of the vehicle 101 and determines whether the current trajectory of the target 205 and/or the current trajectory of the vehicle 101 has changed from the respective predicted trajectories 310, 315. The current trajectories can change based on, e.g., the target 205 slowing, the vehicle 101 braking, etc. If one or both of the current trajectories changes, the relative velocity $V_{rel}$ may change, causing a different frequency shift. If at least one of the trajectories of the target 205 or the vehicle 101 changes, the process 700 returns to the block 710 to predict a second trajectory 310 for the target 205. Otherwise, the process 700 continues in a block 735.

In the block 735, the computer 105 determines whether to continue the process 700. For example, the computer 105 may determine to continue the process 700 when the acoustic message 200 has not completed. In another example, the computer 105 may determine not to continue the process 700 when the vehicle 101 passes the target 205. If the computer 105 determines to continue, the process 700 returns to the block 705 to collect more data 115. Otherwise, the process 700 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, Python, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer and a memory, the memory storing instructions executable by the computer to:
   identify a target;
   input a perceived frequency by the target of an acoustic message to a phase-locked loop to identify a frequency adjustment of the acoustic message to adjust an emitted frequency of the acoustic message from a vehicle to an intended frequency to be received by the target, the perceived frequency based on a predicted target trajectory and a predicted vehicle trajectory, wherein the phase-locked loop minimizes a phase difference between the acoustic message at the perceived frequency and the acoustic message at the intended frequency; and
   emit the acoustic message at the emitted frequency adjusted by the frequency adjustment.

2. The system of claim 1, wherein the instructions further include instructions to identify a frequency shift of the acoustic message based on the predicted target trajectory and the predicted vehicle trajectory.

3. The system of claim 2, wherein the instructions further include instructions to adjust the frequency of the acoustic message to reduce the frequency shift below a shift threshold.

4. The system of claim 1, wherein the instructions further include instructions to identify a type of the target and to predict the target trajectory based on the type of the target.

5. The system of claim 1, wherein the instructions further include instructions to, while emitting the acoustic message, predict a second target trajectory and a second vehicle trajectory and to adjust the emitted frequency of the acoustic message based on the second predicted target trajectory and the second predicted vehicle trajectory.

6. The system of claim 1, wherein the instructions further include instructions to identify a relative velocity between the target and the vehicle and to adjust the emitted frequency of the acoustic message based on the relative velocity.

7. The system of claim 1, wherein the instructions further include instructions to actuate a transducer to steer the acoustic message toward the target.

8. The system of claim 7, wherein the instructions further include instructions to identify a direction vector between the transducer and the target and to rotate the transducer to align with the direction vector.

9. The system of claim 1, wherein the instructions further include instructions to determine a weather datum and to adjust the emitted frequency based on the weather datum.

10. The system of claim 9, wherein the weather datum is at least one of a temperature, a humidity, or an air pressure.

11. The system of claim 9, wherein the instructions further include instructions to determine an ambient speed of sound based on the weather datum.

12. The system of claim 1, wherein the instructions further include instructions to identify a second target and to adjust the emitted frequency of the acoustic message based on the predicted target trajectory and a predicted second target trajectory.

13. The system of claim 1, wherein the instructions further include instructions to adjust an emitted frequency of the acoustic message to generate a predicted perceived frequency received by the target that is within a threshold of a recorded frequency of the acoustic message.

14. The system of claim 1, wherein the instructions further include instructions to identify a change in a target trajectory and to adjust the emitted frequency of the acoustic message based on the change in the target trajectory.

15. A method, comprising:
   identifying a target;
   inputting a perceived frequency by the target of an acoustic message to a phase-locked loop to identify a frequency adjustment of the acoustic message to adjust an emitted frequency of the acoustic message from a vehicle to an intended frequency to be received by the target, the perceived frequency based on a predicted target trajectory and a predicted vehicle trajectory, wherein the phase-locked loop minimizes a phase difference between the acoustic message at the perceived frequency and the acoustic message at the intended frequency; and
   emitting the acoustic message at the emitted frequency adjusted by the frequency adjustment.

16. The method of claim 15, further comprising identifying a frequency shift of the acoustic message based on the predicted target trajectory and the predicted vehicle trajectory.

17. The method of claim 15, further comprising actuating a transducer to steer the acoustic message toward the target.

18. A system, comprising:
   a transducer;
   means for identifying a target;

means for inputting a perceived frequency by the target of an acoustic message to a phase-locked loop to identify a frequency adjustment of the acoustic message to adjust an emitted frequency of the acoustic message from a vehicle to an intended frequency to be received by the target, the perceived frequency based on a predicted target trajectory and a predicted vehicle trajectory, wherein the phase-locked loop minimizes a phase difference between the acoustic message at the perceived frequency and the acoustic message at the intended frequency; and means for emitting the acoustic message at the emitted frequency adjusted by the frequency adjustment.

19. The system of claim 18, further comprising means for identifying a frequency shift of the acoustic message based on the predicted target trajectory and the predicted vehicle trajectory.

20. The system of claim 18, further comprising means for steering the transducer to steer the acoustic message toward the target.

* * * * *